(12) United States Patent
Wang et al.

(10) Patent No.: US 8,555,388 B1
(45) Date of Patent: Oct. 8, 2013

(54) HEURISTIC BOTNET DETECTION

(75) Inventors: Xinran Wang, San Ramon, CA (US);
Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 171 days.

(21) Appl. No.: 13/115,016

(22) Filed: May 24, 2011

(51) Int. Cl.
*G06F 7/04* (2006.01)

(52) U.S. Cl.
USPC ...... 726/23; 726/4; 726/22; 726/30; 709/245; 713/165; 713/188

(58) Field of Classification Search
USPC ........ 726/23–24, 4, 11, 28–29; 713/165, 188; 709/245
See application file for complete search history.

(56) References Cited

U.S. PATENT DOCUMENTS

| | | | |
|---|---|---|---|
| 7,664,855 B1 * | 2/2010 | Freed et al. | 709/225 |
| 7,870,610 B1 * | 1/2011 | Mitchell et al. | 726/23 |
| 7,958,555 B1 | 6/2011 | Chen et al. | |
| 8,260,914 B1 * | 9/2012 | Ranjan | 709/224 |
| 8,291,468 B1 * | 10/2012 | Chickering | 726/1 |
| 8,316,440 B1 | 11/2012 | Hsieh et al. | |
| 8,402,543 B1 * | 3/2013 | Ranjan et al. | 726/23 |
| 8,407,324 B2 * | 3/2013 | McDougal | 709/221 |
| 8,438,639 B2 * | 5/2013 | Lee | 726/22 |
| 2007/0261112 A1 | 11/2007 | Todd et al. | |
| 2008/0016552 A1 | 1/2008 | Hart | |
| 2009/0055928 A1 | 2/2009 | Kang et al. | |
| 2010/0115586 A1 | 5/2010 | Raghavan et al. | |
| 2010/0162350 A1 * | 6/2010 | Jeong et al. | 726/1 |
| 2011/0055923 A1 | 3/2011 | Thomas | |
| 2011/0099620 A1 * | 4/2011 | Stavrou et al. | 726/12 |
| 2011/0185425 A1 * | 7/2011 | Lee et al. | 726/23 |
| 2011/0296486 A1 | 12/2011 | Burch et al. | |
| 2012/0084860 A1 * | 4/2012 | Cao et al. | 726/23 |
| 2012/0089700 A1 * | 4/2012 | Safruti et al. | 709/217 |
| 2012/0096549 A1 * | 4/2012 | Amini et al. | 726/23 |
| 2012/0117650 A1 | 5/2012 | Nachenberg | |
| 2012/0278889 A1 * | 11/2012 | El-Moussa | 726/23 |

OTHER PUBLICATIONS

Xiaonan Zang, Botnet Detection through fine flow classificaiton, CSE Technical Dept, Penn State University, Jan. 31, 2011, vol. 11-001, pp. 1-17.*

Landecki, Grzegorz, Detecting Botnets, Linux Journal, Jan. 1, 2009.

Karasaridis, Anestis et al., Wide-scale Botnet Detection and Characterization, Dec. 14, 2010.

(Continued)

*Primary Examiner* — Nathan Flynn
*Assistant Examiner* — Viral Lakhia
(74) *Attorney, Agent, or Firm* — Van Pelt, Yi & James LLP

(57) ABSTRACT

In some embodiments, heuristic botnet detection is provided. In some embodiments, heuristic botnet detection includes monitoring network traffic to identify suspicious network traffic; and detecting a bot based on a heuristic analysis of the suspicious network traffic behavior using a processor, in which the suspicious network traffic behavior includes command and control traffic associated with a bot master. In some embodiments, heuristic botnet detection further includes assigning a score to the monitored network traffic, in which the score corresponds to a botnet risk characterization of the monitored network traffic (e.g., based on one or more heuristic botnet detection techniques); increasing the score based on a correlation of additional suspicious behaviors associated with the monitored network traffic (e.g., based on one or more heuristic botnet detection techniques); and determining the suspicious behavior is associated with a botnet based on the score.

19 Claims, 9 Drawing Sheets

(56) References Cited

OTHER PUBLICATIONS

Author Unknown, Advanced Persistent Threats (APT), What's an APT? A Brief Definition, Damballa, Dec. 14, 2010.
Author Unknown, The Command Structure of the Aurora Botnet, Executive Overview, Damballa, 2010.
Strayer, W. Timothy et al. Detecting Botnets with Tight Command and Control, BBN Technologies, 2006.
Ramachandran, Anirudh et al., Revealing Botnet Membership Using DNSBL Counter-Intelligence, 2006.
Goebel, Jan et al., Rishi: Identify Bot Contaminated Hosts by IRC Nickname Evaluation, 2007.
Gu, Guofei et al., BotSniffer: Detecting Botnet Command and Control Channels in Network Traffic, 2008.
Gu, Guofei et al., BotHunter: Detecting Malware Infection Through IDS-Driven Dialog Correlation, 2007.
Gu, Guofei et al., BotMiner: Clustering Analysis of Network Traffic for Protocol- and Structure-Independent Botnet Detection, 2008.
Royal, Paul, Analysis of the Kraken Botnet, Damballa, Apr. 9, 2008.
Livadas, Carl et al., Using Machine Learning Techniques to Identify Botnet Traffic, BBN Technologies, 2006.
Binkley, James R. et al., An Algorithm for Anomaly-based Botnet Detection, 2006.
Yen, Ting-Fang et al., Traffic Aggregation for Malware Detection, 2008.
Author Unknown, Anatomy of a Targeted Attack, Damballa, Dec. 3, 2008.
Author Unknown, Layer 8, How and Why Targeted Attacks Exploit Your Users, Damballa, Nov. 2011.
Author Unknown, Targeted Attacks for Fun and Profit, An Executed Guide to a New and Growing Enterprise Threat, Damballa, Oct. 13, 2008.
Author Unknown, A Technology Comparison, AV, IDS/IPS and Damballa's Response to Targeted Attacks, Damballa, Nov. 2008.
Author Unknown, Updated on the Enemy, A Deconstruction of Who Profits From Botnets, Damballa, May 13, 2009.
Author Unknown, A Day in the Life of a BotArmy, Damballa, 2008.
Ollmann, Gunter, Botnet Communication Topologies, Understanding the Intricacies of Bonet Command and Control, Damballa, 2009.
Ollmann, Gunter, The Botnet vs. Malware Relationship, The One to one Botnet Myth, Damballa, 2009.
Author Unknown, Closed Window, How Failsafe Enhancements Dramatically Limit Opportunities for Malware Armies and other Targeted Attacks, Damballa, Sep. 23, 2009.
Author Unknown, Damballa's In-The-Cloud Security Model, Enterprise Protection Moves Beyond the Network Perimeter, Damballa, Aug. 24, 2008.
Ollmann, Gunter, Extracting CnC from Malware, The Role of malware Sample Analysis in Botnet Detection, Damballa, 2009.
Ollmann, Gunter, The Opt-IN Botnet Generation, Hacktivism and Centrally Controlled Protesting, Social Networks, Damballa, 2010.
Ollmann, Gunter, Techniques Used to Automatically Bypass Antivirus Technologies, Serial Variant Evasion Tactics, Damballa, 2009.
Author Unknown, Damballa: A Different Approach, Targeted Attacks Requires a New Solution, Damballa, Sep. 23, 2008.
Author Unknown, Trust Betrayed, What to Do When a Targeted Attack Turns Your Networks Against You, Damballa, 2008.
Author Unknown, How to Be a Hero in the War Against BotArmies, Damballa, 2008.
Giroire, Frederic et al., Exploiting Temporal Persistence to Detect Convert Botnet Channels, 2009.

\* cited by examiner

HEURISTIC BOTNET DETECTION

BACKGROUND OF THE INVENTION

A botnet generally refers to a collection of software (e.g., software agents or robots) that run autonomously and automatically. Examples of botnets include IRC bots and malicious software, and can also include a network of computers using distributed computing software.

Various forms of malicious software detection exist. For example, antivirus software is often used to detect malicious software, which typically uses signature detection techniques in which signature updates are generally provided periodically to the antivirus software for newly generated signatures for newly identified malicious software.

BRIEF DESCRIPTION OF THE DRAWINGS

Various embodiments of the invention are disclosed in the following detailed description and the accompanying drawings.

DETAILED DESCRIPTION

Figure 1:
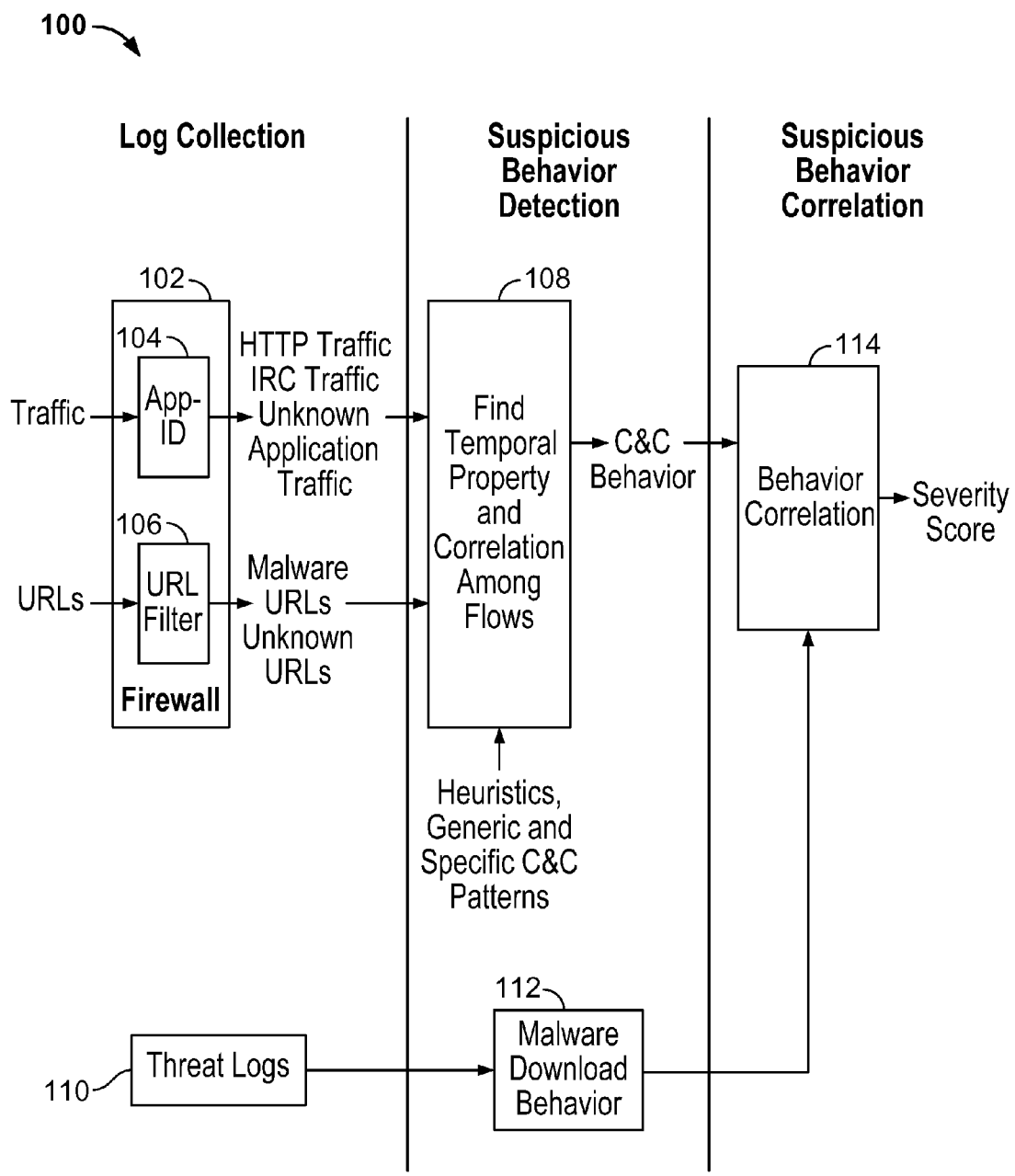
FIG. 1 is a functional diagram of a functional analysis for heuristic botnet detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A botnet generally refers to a collection of compromised hosts, called bots. These bots are controlled by a bot master through a command and control (C&C) channel. Botnets can be generally be classified as IRC-based, HTTP-based, and P2P-based botnets according to the underlying C&C communication protocol.

The term botnet is often used to refer to any group of bots, such as IRC bots (e.g., bots communicating using IRC protocols), HTTP bots (e.g., bots communicating using HTTP protocols), and peer-to-peer (P2P) bots (e.g., bots communicating using peer-to-peer protocols). The term botnet is also generally used to refer to a collection of compromised computers/devices (e.g., often referred to as zombie computers/devices, such as computers executing software). Botnets are usually installed via drive-by downloads exploiting web browser vulnerabilities, worms, Trojan horses, and/or backdoors, under a common command-and-control (C&C) infrastructure.

Botnets are often created for financial gain and/or malicious or target attacks to disrupt and/or to compromise a remote target (e.g., computer systems and/or computer stored information of the remote target). For example, the larger number of devices (e.g., machines, such as various types of computing devices) that are controlled by the botnet, the more computing resources that the botnet controller can use for their intended purpose(s). According to some estimates, up to one quarter of all personal computers connected to the Internet may be part of a botnet. In some cases, the botnet controller can rent the services of the botnet to third parties, such as for sending out spam messages (e.g., a spambot) and/or spamdexing, for performing a denial-of-service (DoS) attack against a remote target, adware, click fraud, and/or spyware for stealing various information (e.g., application serial numbers, login IDs, and/or financial information, such as credit card numbers and/or other identity or confidential information, including possibly confidential corporate information, as in the case of the Aurora botnet).

If the botnet includes a large number of compromised devices, then significant volumes of traffic (e.g., email or DoS traffic) can be generated using all or a subset of the botnet-controlled devices (e.g., compromised hosts). In order to attempt to evade detection (e.g., antispam detection techniques and DoS detection techniques), the volumes of such traffic originating from a single compromised host are made lower for each compromised host and distributed across a greater number of compromised hosts.

Botnets are becoming a significant part of the Internet, which are very difficult to detect due to increasing and evolving techniques used by botnet controllers to avoid detection.

As conventional IRC networks now often use measures to block access to previously hosted botnets, botnet controllers are increasingly using their own servers for controlling the botnets. A botnet will also often include a variety of connections and network types, which adds to the complexity of identifying botnet controllers.

A creator of a botnet (e.g., sometime referred to as a bot master or bot herder) can control the group remotely, usually through a communication channel/protocol, such as Internet Relay Chat (IRC), and usually for malicious and/or unauthorized purposes. For example, IRC bots can be implemented as individual programs (e.g., software agents), and the command-and-control takes place via an IRC server or a specific channel on a public IRC network. This server is often referred to as the command-and-control server (C&C server).

For example, a botnet sends out malware (e.g., a virus(es) or worm(s)) that infect users' computers, in which the malware includes a payload that includes a bot, which is itself a malicious application (e.g., executable code, such as software agents). The bot is executed on the infected users' computers and logs into and communicates with a C&C server (e.g., an IRC server and/or a web server). In some cases, a spammer can purchase the services of the botnet from the botnet operator. The spammer provides the spam messages to the operator, who instructs the compromised machines via the IRC server, causing them to send out spam messages and/or perform other spam related functions.

In some cases, more sophisticated botnet operators are increasingly creating (e.g., programming) their own command-and-control protocols rather than using existing and/or standard protocols, such as customized versions of existing protocols, such as a modified/extended SMTP protocol version, and/or newly created custom protocols. In some cases, fingerprints or protocol signatures can be created to detect such custom command-and-control protocols once such are identified in the wild. Such newly created command-and-control protocols typically include a server program, a client program for operation, and the program that embeds itself on the target's machine (e.g., the bot), which usually communicate with each other over a network using an encryption scheme (e.g., a unique encryption scheme) for stealth and protection against detection or intrusion into the botnet network.

A bot typically executes in a stealth mode to avoid detection and uses a covert channel (e.g., the RFC 1459 (IRC) standard, Twitter®, IM, and/or a newly created protocol) to communicate with its C&C server. Generally, the creator/entity responsible/behind the botnet controller has compromised a series of computers/devices using various tools (e.g., exploits, buffer overflows, as well as other techniques). In a more recent trend, bots can automatically scan their computing/device environment and propagate themselves to other computers/devices using vulnerabilities and weak passwords. The more vulnerabilities a bot can scan, the more valuable it generally becomes to a botnet controller. This process of misappropriating or stealing computing resources as a result of a system being joined to the botnet is often referred to as scrumping.

Botnet servers will also often communicate with other botnet servers. For example, a botnet server group can include several to dozens or more of compromised and/or botnet controller server owned controller devices (e.g., high-speed connected machines, such as computer servers, which may be networked/architected for redundancy and/or fail over). For example, botnet communities usually include one or several controllers that typically do not have highly developed command hierarchies between themselves, rather, they often just rely on individual peer-to-peer/friend-to-friend relationships.

The architecture of botnets is continuing to evolve. For example, botnets use various different topologies (e.g., star, multi-server, hierarchical, and random) for command and control for stealth and resiliency purposes, such as to further complicate command and control location discovery. Another recent trend to avoid detection is for botnets to be smaller in size.

Various host-based botnet detection techniques typically use fingerprint or signature-based techniques to attempt to identify bot behavior that has, for example, bypassed conventional antimalware software (e.g., antivirus software). However, these techniques are only effective if there exists an effective signature for a given botnet. Certain botnets are not yet determined in the wild and, thus, there are no effective signatures available and/or some botnets do not yield themselves for easy signature-based detection techniques. Also, signature-based detection techniques are prone to false positive problems. For example, non-malicious web-based network activity may be improperly identified as being associated with a botnet.

Network-based approaches tend to attempt to identify and completely shut down C&C servers and/or IRC servers. However, as discussed herein, such C&C servers often are difficult to identify and utilize various redundancy techniques that make shutting down C&C servers very difficult. Completely blocking IRC protocols can also be undesirable for, as an example, corporate networks that want to allow users authorized, non-malicious/non-botnet-based use of such IRC protocol activity.

Newer botnets are generally implemented using peer-to-peer (P2P) network communications, with command-and-control embedded into the botnet itself. In some cases, the bot software on the host is dynamically updateable and variable such that the bot can evade having any single point of detection or failure. In some cases, commanders can be identified through secure keys, and all data except the binary itself can be encrypted. For example, a spyware program can use a public/private key encryption technique, in which all suspected passwords are encrypted with a public key hard coded or distributed into the bot software. As a result, the bot can only be read with the private key, which only the commander has. Also, newer botnets have even been capable of detecting and reacting to attempts to figure out how they work. A large botnet that can detect that it is being studied can even execute a distributed denial of service attack (DDoS) directed at those investigating the botnet (e.g., some research labs and companies attempt to emulate botnet behavior in a controlled network environment, such as using several to hundreds of thousands or even millions of Linux kernels and/or virtual machines).

In particular, identifying botnet controllers is difficult for several reasons, such as those discussed above and for various additional reasons, such as those described below. For example, botnets typically attempt to conceal themselves by using different code implementations (e.g., obfuscations, versions, as well as other techniques) on each device (e.g., each client computer, server computer, mobile computing device, and/or other computing device). As a result, signature detection alone is an insufficient technique for botnet detection. As another example, botnet controllers often use new and different C&C servers to avoid detection based on previously identified C&C servers.

To tackle botnets, many approaches are proposed in academia and these research can be classified in two main categories. One category is generally understood to be based on vertical correlation, in which detection of individual bots is attempted by correlating bot-related activities, such as outbound scan, C&C domain visit, and bots download. The other category is generally understood to be based on horizontal correlation, in which network events are correlated to identify botnets in which two or more hosts are involved in similar, malicious communications. The drawback of the horizontal correlation approach is that they cannot detect individual bots.

What is needed are new techniques for botnet detection. In some embodiments, heuristic botnet detection is provided.

In some embodiments, heuristic botnet detection includes using new and precise traffic patterns to identity C&C activities, which provides for improved accuracy and lower false positives. In some embodiments, heuristic botnet detection includes using App-ID based on traffic classification to identify a particular application's traffic. For example, by using App-ID, the traffic of most applications can be excluded, for applications that are understood or determined to not be used for botnet C&C. Thus, this exclusion of such traffic reduces false positives and makes identifying unknown botnet C&C protocol within significant volumes of traffic possible. As a result, the heuristic botnet detection can be focused on web browsing traffic, IRC traffic, and/or unknown application traffic (e.g., unclassified traffic).

In some embodiments, heuristic botnet detection includes using a URL filter as described herein. For example, by applying a URL filter, traffic analysis can be focused on malware download URLs and URLs in the unknown category (e.g., unclassified URLs). Thus, using the URL filter reduces false positives and also facilitates analysis of significant numbers of URLs.

In some embodiments, heuristic botnet detection includes the use of new traffic patterns (e.g., generic traffic patterns and specific traffic patterns) to identify botnet C&C activities. In some embodiments, heuristic botnet detection includes the use of new generic traffic patterns to identify botnet C&C activities. In some embodiments, heuristic botnet detection includes the use of new specific traffic patterns to identify botnet C&C activities. As described herein, a specific traffic pattern identifies a specific botnet, and a generic traffic pattern identifies new or an unknown category of or a set of botnets. Both types of traffic patterns have unique properties, such as periodic communication with a C&C server and multiple traffic flows correlation. For example, periodically visiting a malware URL is a generic traffic pattern that identifies generic HTTP-based C&C. As another example, a host visiting a malware domain twice every 5 hour and 14 minutes is a specific pattern for a variant of Swizzor botnets.

In some embodiments, heuristic botnet detection includes various heuristic techniques as described herein with respect to various embodiments. For example, a heuristic can be provided for detecting activities related to visiting recent created domains and classifying such activities as suspicious. Various other heuristic related techniques for heuristic botnet detection are described herein with respect to various embodiments.

In some embodiments, heuristic botnet detection is provided. In some embodiments, heuristic botnet detection includes a system, process, and/or computer program product the performs the following: monitoring network traffic to identify suspicious network traffic; and detecting a bot based on a heuristic analysis of the suspicious network traffic behavior using a processor, in which the suspicious network traffic behavior includes command and control traffic associated with a bot master.

In some embodiments, the suspicious behavior is a malware download.

In some embodiments, the suspicious behavior is a command and control communication determined using a plurality of heuristics.

In some embodiments, the monitored network traffic includes HTTP traffic, IRC traffic, and unclassified application traffic.

In some embodiments, the monitored network traffic includes malware URLs and unclassified URLs.

In some embodiments, the monitored network traffic includes firewall logs.

In some embodiments, heuristic botnet detection further includes identifying generic command and control traffic patterns, and identifying specific command and control traffic patterns.

In some embodiments, heuristic botnet detection further includes classifying the monitored network traffic as command and control traffic associated with a bot master.

In some embodiments, heuristic botnet detection further includes correlating the suspicious network traffic behavior with a plurality of other suspicious behaviors.

In some embodiments, heuristic botnet detection further includes correlating the suspicious network traffic behavior with a plurality of other suspicious behaviors associated with a client or a plurality of clients.

In some embodiments, heuristic botnet detection further includes assigning a score to the monitored network traffic, in which the score corresponds to a botnet risk characterization of the monitored network traffic. In some embodiments, heuristic botnet detection further includes increasing the score based on a correlation of additional suspicious behaviors associated with the monitored network traffic. In some embodiments, heuristic botnet detection further includes determining the suspicious behavior is associated with a botnet based on the score.

In some embodiments, heuristic botnet detection further includes monitoring behavior indicated in the network traffic to identify malware, in which the monitored behaviors that indicate potential malware include one or more of the following: connecting to a non-standard HTTP port for HTTP traffic, visiting a non-existent domain, downloading executable files with non-standard executable file extensions, performing a DNS query for an email server, communicating using HTTP header with a shorter than common length, communicating using a post method in HTTP traffic, connecting to a non-standard IRC port for IRC traffic, communicating using an intrusion prevention system evasion techniques, and communicating unclassified traffic over an HTTP port.

In some embodiments, heuristic botnet detection further includes monitoring behavior indicated in the network traffic to identify malware, in which the monitored behaviors that indicate potential malware include one or more of the following: visiting a domain with a domain name that is longer than a common domain name length, visiting a dynamic DNS domain, visiting a fast-flux domain, and visiting a recently created domain.

In some embodiments, heuristic botnet detection further includes monitoring visited domain related behavior to identify a malicious domain, in which the monitored visited domain related behavior indicates a potentially malicious domain based on one or more of the following: a domain name length of a visited domain, whether a visited domain is a dynamic DNS domain, whether a visited domain is a fast-flux domain, and whether a visited domain is a recently created domain.

FIG. 1 is a functional diagram of a functional analysis for heuristic botnet detection (100) in accordance with some embodiments. In some embodiments, heuristic botnet detection includes network traffic monitoring and/or network traffic log collection (e.g., threat logs) to identify suspicious or potentially suspicious behavior. For example, network traffic flows can be monitored using a traffic flow analysis engine to identify or classify monitor network traffic by traffic flow types and application associations and forwarded to a heuristic botnet detection engine for potential C&C behavior analysis using various heuristic botnet detection techniques (e.g., generic and/or specific C&C traffic pattern based heuristics) as described herein. Also, URLs can be identified in network traffic using a URL filter and forwarded to a heuristic botnet detection engine for potential C&C behavior analysis using various heuristic botnet detection techniques (e.g., generic and/or specific C&C traffic pattern based heuristics) as described herein. In some embodiments, the threat logs can be analyzed to identify malware downloads or potential malware download behaviors. In some embodiments, the C&C behavior results and malware download behavior results are correlated to determine a potential malicious or verified botnet detection (e.g., based on a severity/botnet/malware score or another form of valuation or classification based on the heuristic analysis of the monitored network traffic behaviors).

As shown in FIG. 1, network traffic is monitored at a firewall 102. In some embodiments, network traffic is monitored using a data appliance (e.g., a security appliance that includes a firewall). In some embodiments, network traffic is monitored using a gateway (e.g., a security gateway). In some embodiments, network traffic is monitored using a host (e.g., security software executed on a host, such as a network server or client computing device). In some embodiments, the network traffic is monitored using in-line monitoring techniques. In some embodiments, the network traffic is collected and/or monitored (e.g., some of the network traffic can be monitored using in-line monitoring techniques and/or some of the network traffic can be collected and analyzed for monitoring the network traffic offline, such as in logs of network traffic).

In some embodiments, network traffic is monitored using a state-based firewall. In some embodiments, the state-based firewall can monitor traffic flows using APP-ID engine 104. For example, the monitored network traffic can include HTTP traffic, IRC traffic, unclassified application traffic (e.g., unknown application traffic), and/or other types of traffic (e.g., traffic using other types of known or unknown protocols). APP-ID engine 104 can be configured to determine what type of traffic the session involves, such as HTTP traffic, IRC traffic, unknown traffic, and possibly other types of traffic, and such classified traffic can be directed to an appropriate decoder to decode the classified traffic for each monitored session's traffic flow.

In some embodiments, network traffic is monitored using a URL filter 106 to monitor and identify URLs as described herein with respect to various embodiments. For example, the monitored network traffic can include various URLs or domain information, such as malware URLs, unclassified URLs (e.g., unknown URLs), and possibly other classified categories of URLs (e.g., potentially suspicious URLs and/or known good URLs).

In some embodiments, the monitored traffic is classified based on traffic protocols and possibly associated based on application using APP-ID engine 104 and provided to a heuristic behavior analysis engine 108. In some embodiments, URLs (e.g., URLs identified in HTTP requests or other network traffic requests, including one or more URLs) are classified by URL filter 106 and provided to heuristic behavior analysis engine 108. In some embodiments, heuristic behavior analysis engine 108 identifies the following types of suspicious botnet behavior: C&C communications; and malware downloads. In some embodiments, heuristic behavior analysis engine 108 performs various heuristics for behavioral monitoring of the network traffic related activities as described herein with respect to various embodiments. In some embodiments, generic C&C traffic patterns are used to identify C&C patterns as described herein with respect to various embodiments. In some embodiments, specific C&C traffic patterns are used to identify C&C patterns as described herein with respect to various embodiments. In some embodiments, heuristic behavior analysis engine 108 is updated with new heuristics. For example, heuristic behavior analysis engine 108 can be updated with new generic C&C pattern-based heuristics, new specific C&C pattern-based heuristics, or both, which can be received as a software and/or malware/heuristics related content update using various software and/or content push or pull related updating techniques. In some embodiments, heuristics are stored locally. In some embodiments, new heuristics are received from a security cloud service or a security content update subscription service from a trusted security provider (e.g., using secure communication techniques). In some embodiments, heuristic behavior analysis engine 108 communicates the C&C behavior results to behavior correlation engine 114.

In some embodiments, threat logs 110 (e.g., threat logs collect from security or network monitoring devices or functions) can also be used in the network traffic monitoring analysis (e.g., threat logs from a security appliance or firewall). In some embodiments, threat logs 110 are provided to a malware download behavior engine 112. In some embodiments, malware download behavior engine 112 analyzes the threat logs 110 to identify potentially suspicious behavior, such as to identify the potential or verified malware download behavior. In some embodiments, malware download behavior engine 112 communicates the malware download behavior results to behavior correlation engine 114.

In some embodiments, behavior correlation engine 114 correlates received C&C behavior data from the heuristic engine 108 and received malware download behavior from malware download behavior engine 112 to generate a score. In some embodiments, the generated score is a severity score that provides a value indicator of whether a particular traffic flow behavior is suspicious or verified to represent botnet related behavior. In some embodiments, the severity score or severity score range is used for classifying monitored network traffic (e.g., traffic flows associated with an application(s)). In some embodiments, a value range of a severity score is classified as not malicious, a second value range (e.g., a higher range of values) is classified as potentially malicious behavior, and a third value range (e.g., an even higher range of values) is classified as malware behavior corresponding to botnet detection. In some embodiments, a traffic flow that is classified as potentially malicious is identified for further monitoring and/or evaluation until the traffic flow is verified and classified as not malicious or is verified and classified as malicious.

In some embodiments, the detected behaviors based on the various traffic monitoring techniques described above are correlated. In some embodiments, a score is generated for each monitored network traffic activity, such as a severity score as an indicator of the potentially malicious behavior associated with the monitored network traffic as described herein with respect to various embodiments.

In some embodiments, various other functional architectures and flows are provided to implement the various heuristic botnet detection techniques described herein. For example, some of these functions can be implemented in software executed on a general processor and/or some of these functions can be implemented using hardware acceleration techniques for faster packet processing of network traffic.

Figure 2:
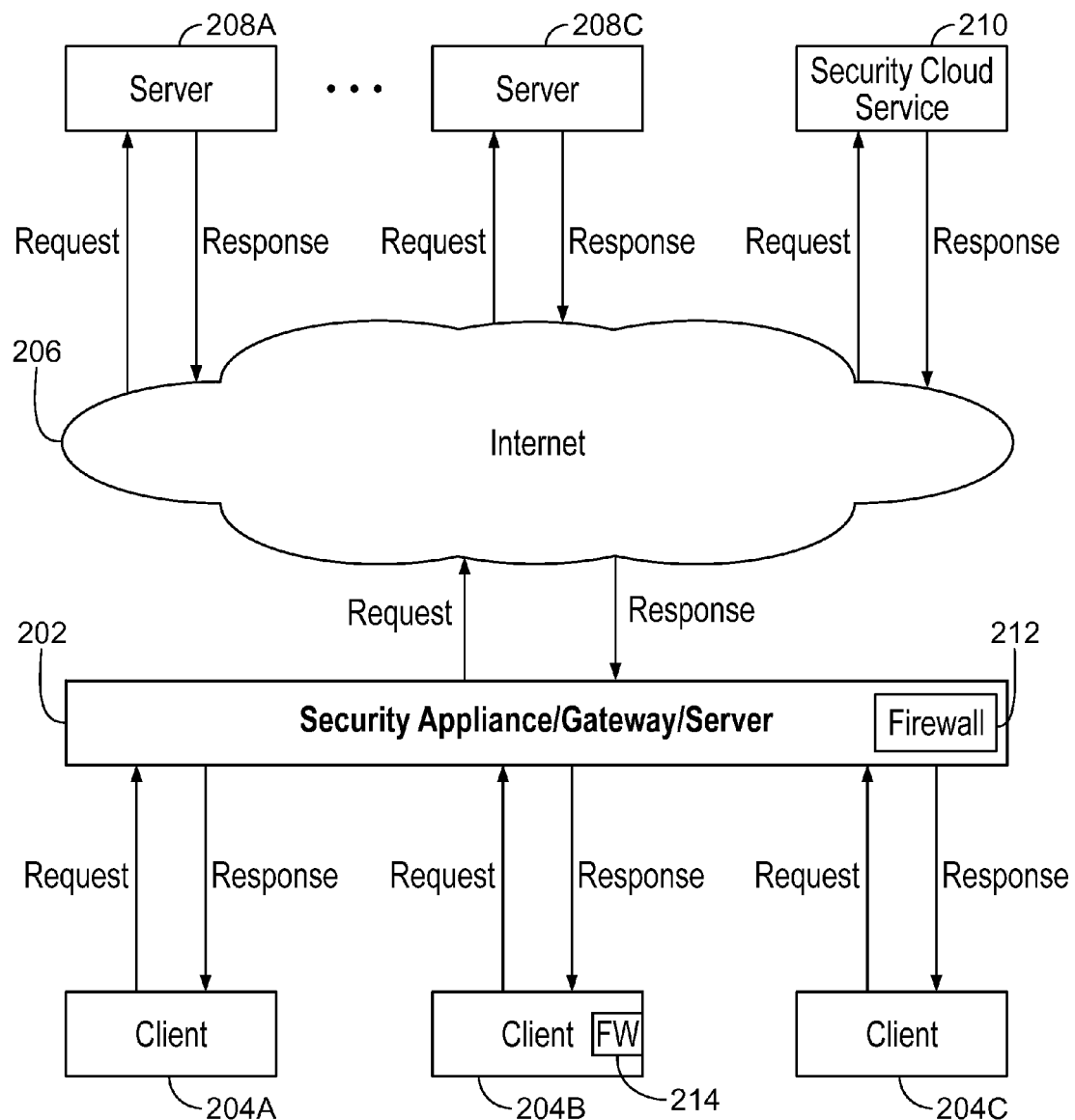
FIG. 2 is a block diagram illustrating an architecture for heuristic botnet detection in accordance with some embodiments.

FIG. 2 is a block diagram illustrating an architecture for heuristic botnet detection in accordance with some embodiments. As shown in FIG. 2, client devices 204A, 204B, and 204C are in communication with the Internet 206 via a security device 202. In some embodiments, the security device 202 includes a firewall 212 as shown. In some embodiments, one or more of the client devices 204A-204C includes a firewall 214 (e.g., host based firewall) as shown. In some embodiments, the security device 202 includes a data appliance (e.g., a security appliance), a security gateway, a security server, and/or some other security device, which, for example, can be implemented using computing hardware, software, or various combinations thereof. For example, client devices 204A-C can include various computing devices that can access the Internet via wired and/or wireless communications, such as computers, laptops, tablets, smart phones, and/or various other types of computing devices with network communication capabilities. As also shown, servers 208A and 208B are in communication with the Internet. For example, a client device can access a service provided by a server via the Internet, such as a web related service (e.g., web site, cloud-based services, streaming services, or email service), peer-to-peer related service (e.g., file sharing), IRC service (e.g., chat service), and/or any other service that can be delivered via the Internet.

In some embodiments, the security device 202 implements various network security functions including heuristic botnet detection techniques as described herein with respect to various embodiments. In some embodiments, the various network security functions for heuristic botnet detection as described herein with respect to various embodiments are implemented in part in security device 202 and in part in each of the client devices (e.g., client 204B using firewall 214). In some embodiments, the various network security functions for heuristic botnet detection techniques as described herein with respect to various embodiments are implemented in part in security device 202 and in part using a cloud-based security service 210 accessible via the Internet 206 (e.g., using secure communications), as described further herein with respect to various embodiments. In some embodiments, the various network security functions for heuristic botnet detection techniques as described herein with respect to various embodiments are implemented in part in security device 202, in part using a cloud-based security service accessible via the Internet (e.g., using secure communications), and in part in each of the client devices. In some embodiments, the various network security functions for heuristic botnet detection techniques as described herein with respect to various embodiments are implemented in each of the client devices (e.g., implemented as security software executed on each client device and/or in client device hardware, such as a general processor and/or modem processor). In some embodiments, the various network security functions for heuristic botnet detection techniques as described herein with respect to various embodiments are implemented in part in each of the client devices and in part using a cloud-based security service accessible via the Internet (e.g., using secure communications).

For example, the security device 202 (e.g., an integrated security appliance/gateway/server) can communicate with security cloud service 210 (e.g., using secure communications, such as encrypted communication techniques) to receive heuristic content updates. As another example, the security device 202 (e.g., an integrated security appliance/gateway/server) can communicate with security cloud service 210 (e.g., using secure communications, such as encrypted communication techniques) to provide the monitored traffic information and/or identified URLs, and the security cloud service 210 can perform the heuristic botnet detection analysis as described herein (e.g., the heuristic botnet detection function 108 described above with respect to FIG. 1 can be implemented by the security cloud service 210). As yet another example, the security cloud service 210 can perform the malware download behavior analysis of threat logs as described herein (e.g., the malware download behavior function 112 described above with respect to FIG. 1 can be implemented by the security cloud service 210). As a further example, unknown application traffic can be forwarded to the security cloud service 210 for further analysis, and/or unknown URLs can be forwarded to the security cloud service 210 for further analysis. As another example, C&C behavior and/or malware download behavior can be provided to the security cloud service 210 to perform behavior correlation (e.g., the behavior correlation function 114 described above with respect to FIG. 1 can be implemented by the security cloud service 210). As will now be apparent, some or all of the functions described above with respect to FIG. 1 can be assisted by or implemented in whole or in part by the security cloud service. The security cloud service can allow for reducing the processing on the client device (e.g., 204B) and/or security device 202 by performing some of these functions. The security cloud service can also provide additional heuristic based analysis and/or use additional information by having received many more network traffic flows of information (e.g., including network traffic behaviors and/or URLs) and can aggregate such information to provide for more information for certain application traffic flows and/or URLs that may not (yet) be known by the security device 202.

For example, the security device can communicate a client's outbound request to access a network site (e.g., foobar.com) to the security cloud service to request whether the network site (e.g., foobar.com) is a potentially malicious URL/malicious web site or malware URL/malware web site. As another example, botnet reports can be communicated to the security cloud service, and the security cloud service can aggregate the botnet reports to correlate potentially suspicious botnet behavior to determine whether one or more network sites are potentially malicious sites and/or malware sites (e.g., a spike in traffic to a particular network site, in which the network site is a newly registered domain and/or other patterns or behaviors or combinations thereof, such as those described herein). As yet another example, the cloud security service can aggregate and correlate botnet reports received from multiple security gateways, security appliances, and/or other security software/hardware elements in order to determine potentially malicious sites and/or malware sites. The cloud security service can also periodically update potentially malicious and/or malware site information that can be distributed via various security subscriptions or upon request or based on events or configured updating requirements.

In some embodiments, the security appliance/gateway/server also includes a firewall function 212. In some embodiments, one or more of the client devices includes a managed firewall, such as firewall 214 of client 204B. In some embodiments, a list of potentially malicious and/or malware network sites is published to such firewalls or another security software/hardware element, such as for implementing various firewall policy actions, such as block and/or packet capture for monitoring for blocking access or for monitoring access to/from the network site. In some embodiments, heuristics for botnet detection (e.g., generic C&C pattern based heuristics and/or specific C&C pattern based heuristics) are published to such firewalls or another security software/hardware element (e.g., botnet detection heuristics engine 108), such as for implementing heuristic botnet detection as described herein.

Figure 3:
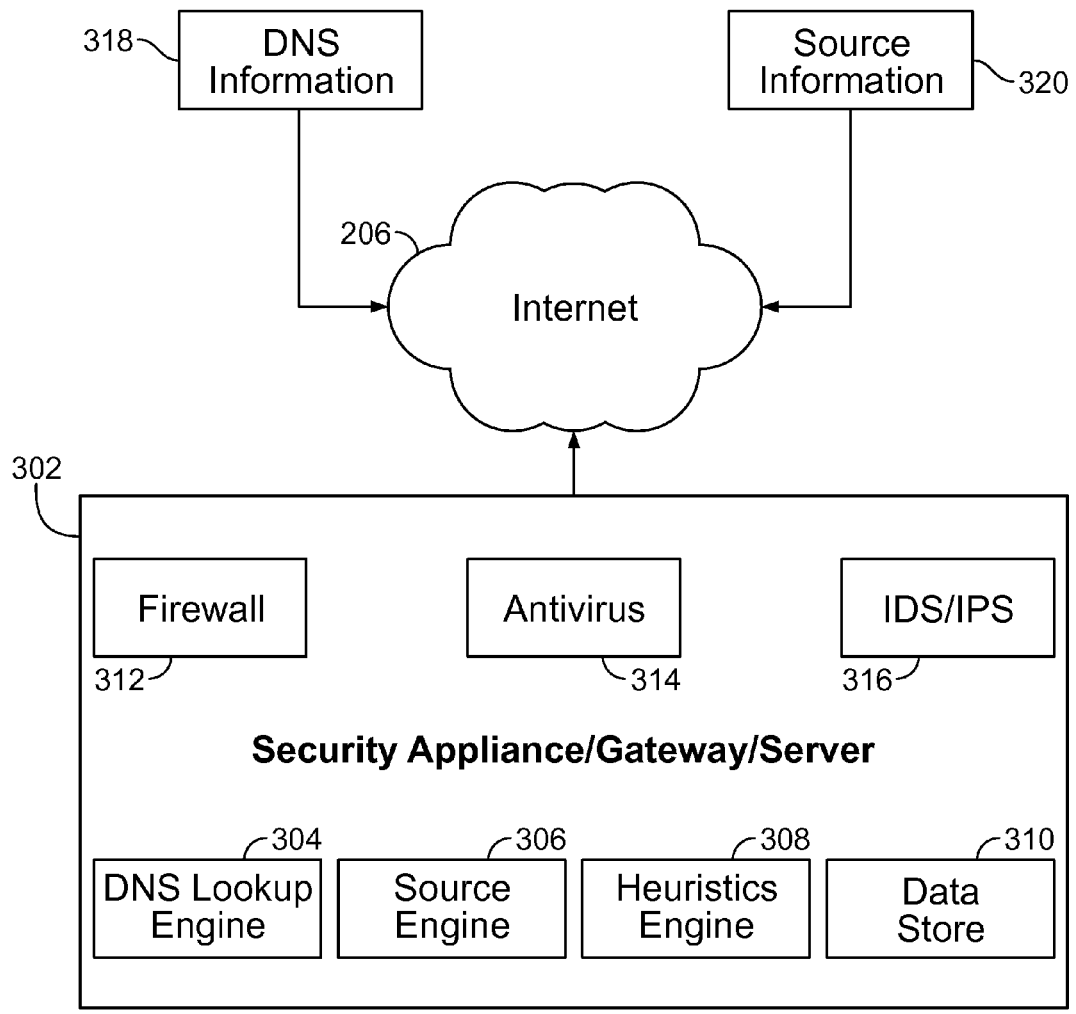
FIG. 3 is illustrating another architecture for heuristic botnet detection in accordance with some embodiments.

FIG. 3 is illustrating another architecture for heuristic botnet detection in accordance with some embodiments. As shown in FIG. 3, a security device 302 (e.g., security appliance/gateway/server) includes a DNS lookup engine 304 that communicates with a DNS information 318. For example, the DNS lookup engine 304 can request and process DNS information for network sites from the DNS information 318 (e.g., using DNS lookup utilities the following information can be determined: IP addresses associated with the domain, mail exchanges associated with the entry, authoritative name servers for the domain, and other domains using the same IP addresses by leveraging reverse DNS lookup). As another example, heuristic botnet detection can include processing zone files for changes in domain registration information (e.g., DNS information changes, such as DNS related churn). As also shown, a security device 302 includes a data store 310. In some embodiments, the data store 310 stores various security related information, such as DNS related information processed by and/or provided by the DNS lookup engine 304. In some embodiments, the data store 310 stores various other security related information, such as heuristics for botnet detection (e.g., general and/or specific C&C patterns as describe herein).

As also shown in FIG. 3, the security device 302 includes a source engine 306 that communicates with source information 320. For example, the source engine 306 can request and process source information for network sites from the source information 320 (e.g., a system to aggregate, normalize, and collate information from a regional Internet registry (RIR) and Internet routing information, such as BGP table). As another example, identification of malware sites using unknown URL sites and newly registered DNS addresses can include implementing a source engine to identify the source associated with a network site (e.g., country, ASN, and/or network domain provider). In some embodiments, the data store 310 stores various security related information, such as source related information processed by and/or provided by the source engine 306.

As also shown in FIG. 3, the security device 302 includes a heuristics engine 308. In some embodiments, heuristics engine 308 performs some or all of the functions described above with respect to FIG. 1. In some embodiments, the security device 302 includes a list of known bad domains (e.g., a black list of known bad/malware web sites by URL). In some embodiments, the security device 302 includes a list of known good domains (e.g., a white list of known good web sites by URL). In some embodiments, the security device 302 includes a recent domain hash table for a more efficient black list storage approach (e.g., to reduce the amount of storage for the URL blacklist). For example, the recent hash table can be stored in data store 310. In some embodiments, the security device 302 includes a known bad domains list/blacklist (e.g., collected by the security appliance, received from a security cloud service or security content update subscription service, and/or public source(s)).

For example, for each URL identified in network traffic being monitored by the security device, if the URL category is unknown (e.g., not (yet) blacklisted), then a hash lookup can be performed to determine if the domain associated with this URL has been registered recently (e.g., within the last 3 days or some other specified time period). For example, a few million domain names can be stored in the hash table to minimize storage requirements for this particular security function. If the URL is determined to be associated with a recently registered domain name, then a severity score can be generated based (at least in part) on the observed IP associated with the suspicious domain name/URL (e.g., a severity score can be based on a scale of 1 to 10, with increments based on monitored activities, such as increasing a severity score from a 1 to a 6 if the monitored network traffic is determined to include attempts to download an executable/.exe file(s), command and control traffic (C&C) identified based on heuristic botnet detection techniques, threat log reviewed—IRC application used to connect to that host, and/or other combinations of signature and/or heuristic botnet detection techniques). As another example, reporting can be configured based on thresholds (e.g., reporting of severity scores that are higher than 3) and can include, for example, scoring, and the report can identify by domain, source IP address, and/or other parameters and information.

As also shown in FIG. 3, the security device 302 includes various other security functionality, including firewall 312, antivirus 314, and IDS/IPS (intrusion detection system/intrusion prevention system) 316. In some embodiments, these other security functions can be implemented in part or completely on other security devices in communication with the security device 302 and/or implemented in part or completely on the client devices. In some embodiments, the security device 302 can implement various techniques described herein for heuristic botnet detection, and in some embodiments, in combination with various other techniques for heuristic botnet detection, and/or publish such information to these other security functions to implement various security functions based on heuristic botnet detection, including, for example, identification of potentially suspicious and/or malware sites, such as to block access to such sites and/or monitor access to such sites.

Figure 4:
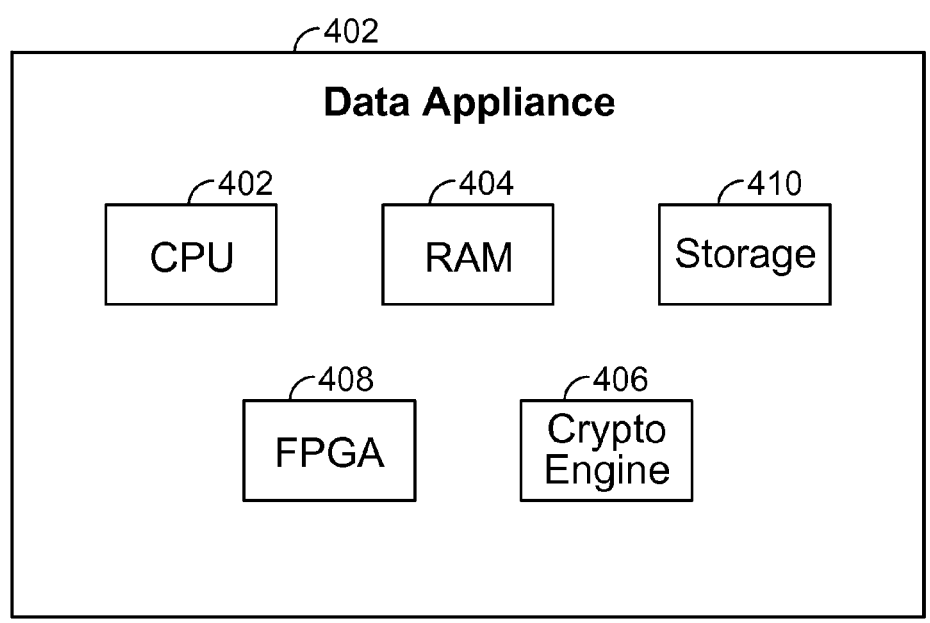
FIG. 4 illustrates a functional diagram of hardware components of a data appliance for heuristic botnet detection in accordance with some embodiments.

FIG. 4 illustrates a functional diagram of hardware components of a data appliance (e.g., security appliance 202 or security appliance 302) for heuristic botnet detection in accordance with some embodiments. The example shown is a representation of physical components that can be included in data appliance 402. Specifically, data appliance 402 includes a high performance multi-core CPU 402 and RAM 404. Data appliance 402 also includes a storage 410 (e.g., one or more hard disks), which is used to store policy and other configuration information. Data appliance 402 can also include one or more optional hardware accelerators. For example, data appliance 402 can include a cryptographic engine 406 configured to perform encryption and decryption operations, and one or more FPGAs 408 configured to perform signature matching, act as network processors, and/or perform other tasks.

Figure 5:
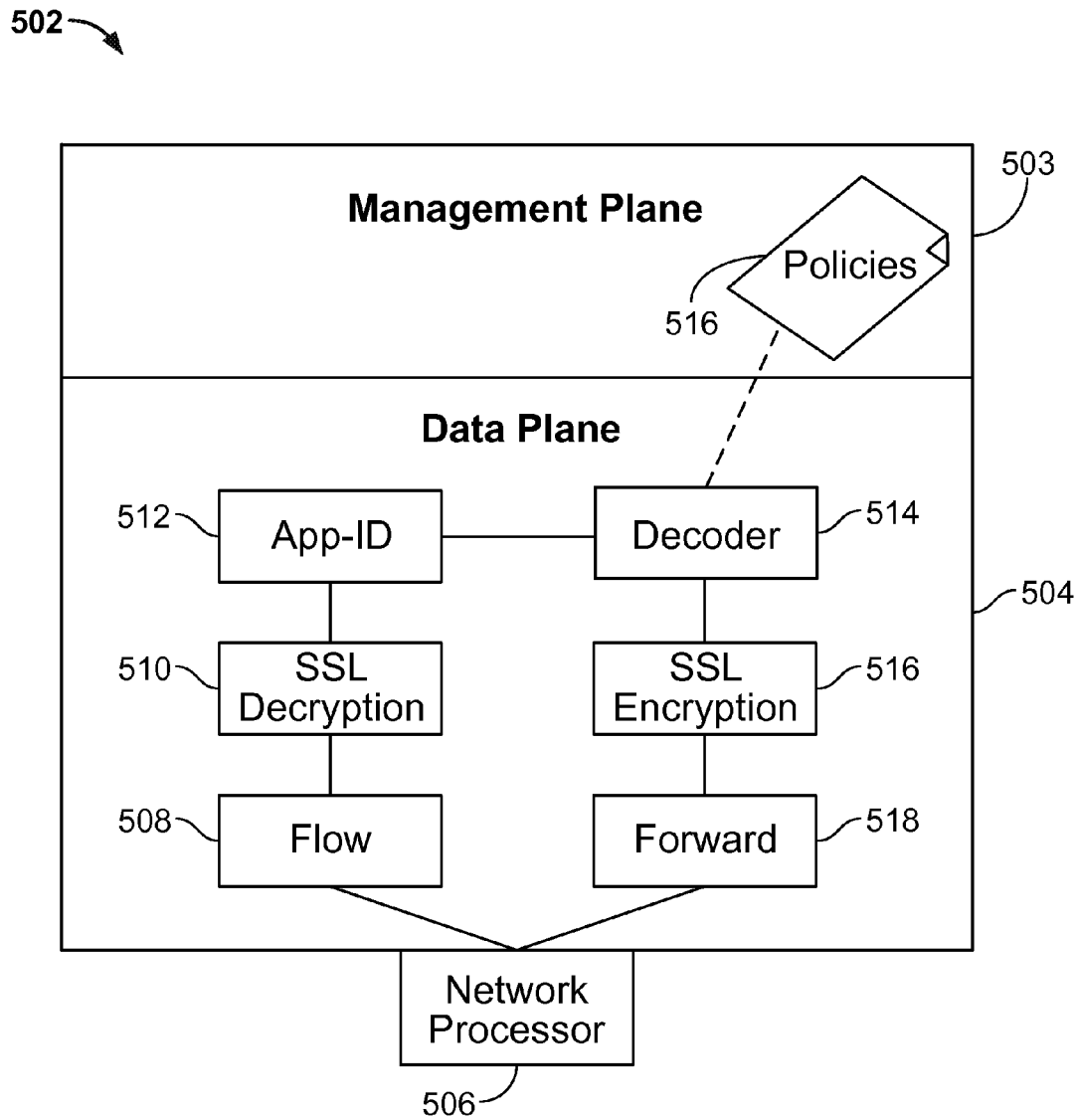
FIG. 5 illustrates a functional diagram of logical components of a data appliance for heuristic botnet detection in accordance with some embodiments.

FIG. 5 illustrates a functional diagram of logical components of a data appliance (e.g., security appliance 202 or security appliance 302) for heuristic botnet detection in accordance with some embodiments. The example shown is a representation of logical components that can be included in data appliance 502. As shown, data appliance 502 includes a management plane 503 and a data plane 504. In some embodiments, the management plane is responsible for managing user interactions, such as by providing a user interface for configuring policies and viewing log data. The data plane is responsible for managing data, such as by performing packet processing and session handling.

Suppose a client 204A attempts to access a server 204C using an encrypted session protocol, such as SSL. Network processor 506 is configured to receive packets from client 204A, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decrypter 510. Otherwise, processing by SSL decrypter 510 is omitted. Application identification module 512 (e.g., APP-ID engine 104) is configured to determine what type of traffic the session involves. For example, application identification module 512 can recognize a GET request in the received data and conclude that the session requires an HTTP decoder. For each type of protocol, there exists a corresponding decoder 514. Based on the determination made by application identification module 512, the packets are sent to an appropriate decoder 514. Decoder 514 is configured to assemble packets (e.g., which may be received out of order) into the correct order, perform tokenization, and extract out information. Decoder 514 also performs signature matching to determine what should happen to the packet. In some embodiments, heuristic botnet detection techniques are applied as described herein with respect to various embodiments based on the monitored, identified, and decoded session traffic flows. In some embodiments, decoder 514 can also enforce rules (516) provided by management plane 502, including those applicable based on heuristic botnet detection as described herein.

Figure 6:
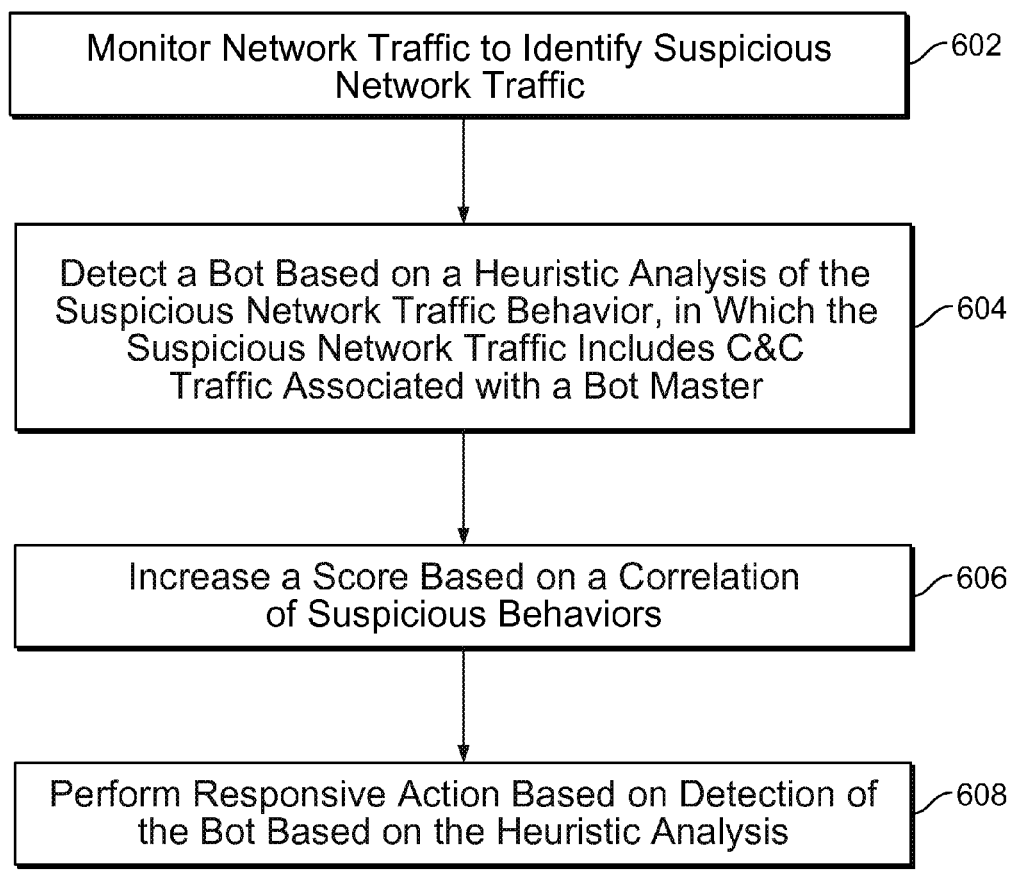
FIG. 6 is a flow diagram for heuristic botnet detection in accordance with some embodiments.

FIG. 6 is a flow diagram for heuristic botnet detection in accordance with some embodiments. At 602, network traffic is monitored to identify suspicious network traffic (e.g., security device 202 can monitor network traffic to identify suspicious network traffic or another security device/function). At 604, heuristic botnet detection is performed based on a heuristic analysis of the suspicious network traffic behavior, in which the suspicious network traffic includes C&C traffic associated with a bot master. At 606, a score (e.g., a severity score or botnet/malware score) is increased based on a correlation of suspicious behaviors. At 608, a responsive action is performed based on a detection of the botnet behavior based on the heuristic analysis (e.g., a firewall block, firewall monitor, other security related responsive behavior, or reporting action can be performed using the security device 202 or another security device/function).

Figure 7:
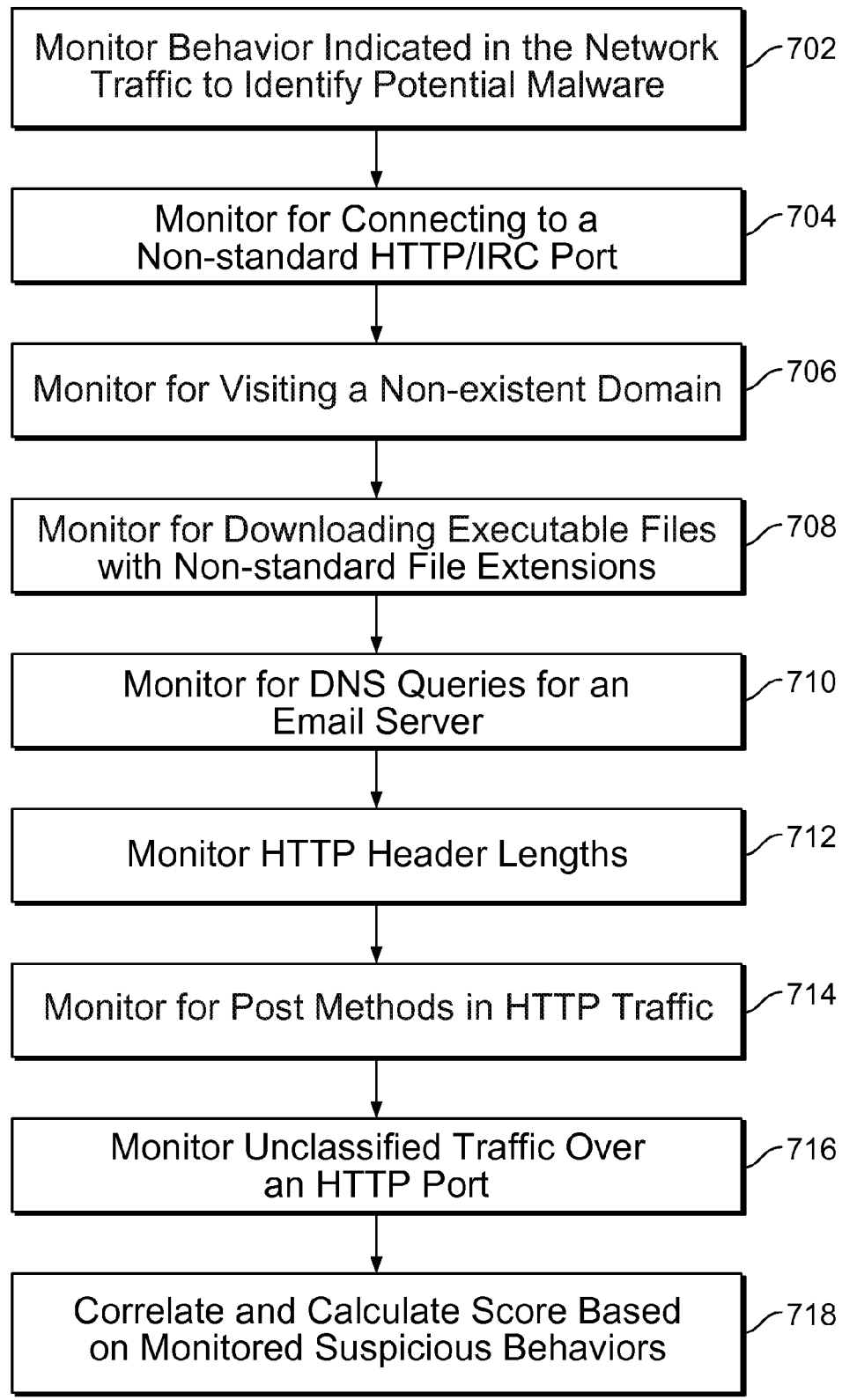
FIG. 7 is another flow diagram for heuristic botnet detection in accordance with some embodiments.

FIG. 7 is another flow diagram for heuristic botnet detection in accordance with some embodiments. At 702, monitoring behavior indicated in the network traffic to identify malware or potential malware is performed. At 704, monitoring behavior indicated in the network traffic for connecting to a non-standard HTTP port for HTTP traffic is performed (e.g., using a port other than port 80 for HTTP traffic). At 706, monitoring behavior indicated in the network traffic for visiting a non-existent domain is performed. At 708, monitoring behavior indicated in the network traffic for downloading executable files with non-standard executable file extensions is performed (e.g., executable files with file extensions that are different from a common ".exe" file extension). At 710, monitoring behavior indicated in the network traffic for performing a DNS query for an email server is performed. At 712, monitoring behavior indicated in the network traffic for communicating using HTTP header with a shorter than common length is performed. For example, a threshold can be set at three HTTP header fields, which can be triggered by the following example in which there are only two HTTP header fields "User-agent" and "host":

GET/xin.rar HTTP/1.1
User-Agent: RookIE/1.0
Host: www.wc86.com

At 714, monitoring behavior indicated in the network traffic for communicating using a post method in HTTP traffic is performed. At 716, monitoring behavior indicated in the network traffic for communicating unclassified traffic (e.g., unknown application traffic) over an HTTP port is performed. In some embodiments, various other heuristics can be performed for network traffic behavior monitoring for identifying potential malware. For example, network traffic can be monitored to identify the behavior of connecting to a non-standard IRC port for IRC traffic. As an example, in an HTTP post request, assume a string "POST" is sent through three IP packets. The first packet is a single character "P", the second is a duplicated "P", the third one is "ost". This technique would evade any firewall/IPS functions that do not reassemble TCP packets, but using the techniques described herein, which include reassembly TCP packets, this type of behavior can be detected. As another example, monitoring behavior indicated in the network traffic for communicating using intrusion prevention system evasion techniques is also performed (e.g., IRC protocol traffic using port 80, which is typically only used by HTTP protocol traffic). At 718, correlating the monitored and classified network traffic behaviors is performed, and a score (e.g., a severity score, botnet score, or malware score) is calculated based on the monitored/classified suspicious behaviors.

Figure 8:
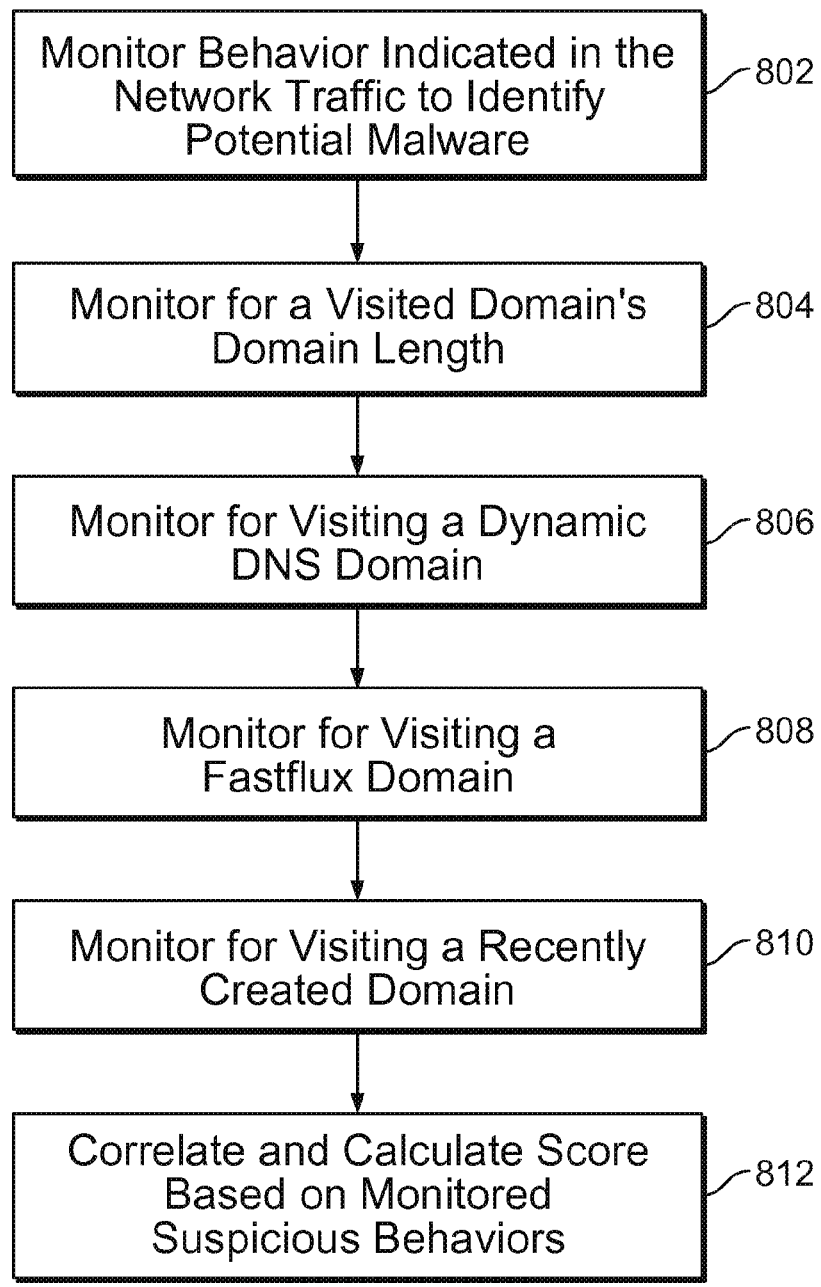
FIG. 8 is another flow diagram for heuristic botnet detection in accordance with some embodiments.

FIG. 8 is another flow diagram for heuristic botnet detection in accordance with some embodiments. At 802, monitoring behavior indicated in the network traffic to identify malware is performed. At 804, monitoring behavior indicated in the network traffic for visiting a domain with a domain name that is longer than a common domain name length is performed (e.g., a known malware visits domain 2.0.0.805.784286832.1595022578.128.4096.014a0d3f846ea4af889dd9d8bc8aa80bc65807eadd2dbb27f1.twothousands.com, in which the threshold length is 90). At 806, monitoring behavior indicated in the network traffic for visiting a dynamic DNS domain is performed. At 808, monitoring behavior indicated in the network traffic for visiting a fast-flux domain is performed. At 810, monitoring behavior indicated in the network traffic for visiting a recently created domain is performed. At 812, correlating the monitored and classified network traffic behaviors is performed, and a score (e.g., a severity score, botnet score, or malware score) is calculated based on the monitored/classified suspicious behaviors.

Figure 9:
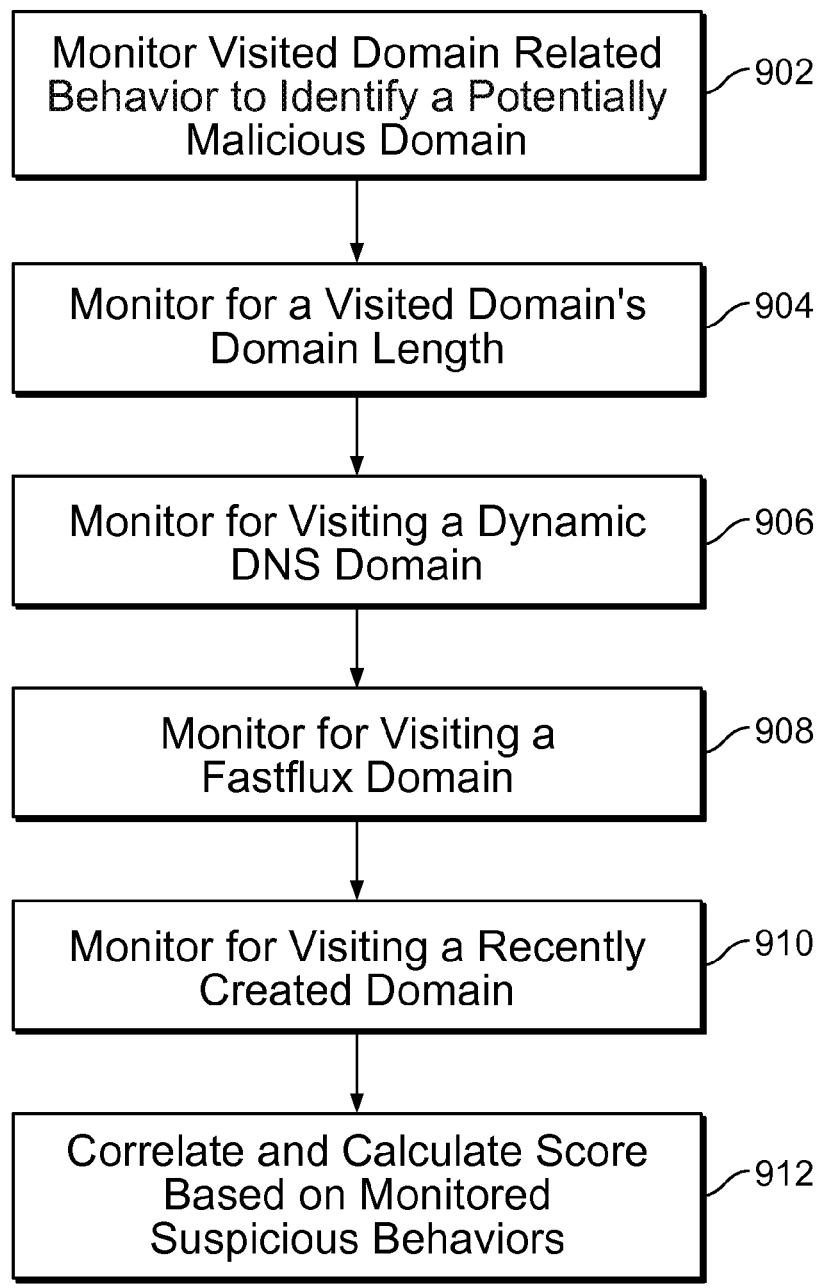
FIG. 9 is another flow diagram for heuristic botnet detection in accordance with some embodiments.

FIG. 9 is another flow diagram for heuristic botnet detection in accordance with some embodiments. At 902, monitoring visited domain related behavior to identify a malicious domain is performed. At 904, monitoring visited domain related behavior for a domain name length of a visited domain is performed. At 906, monitoring visited domain related behavior for whether a visited domain is a dynamic DNS domain is performed. At 908, monitoring visited domain related behavior for whether a visited domain is a fast-flux domain is performed. At 910, monitoring visited domain related behavior for whether a visited domain is a recently created domain is performed. At 912, correlating the monitored and classified network traffic behaviors is performed, and a score (e.g., a severity score, botnet score, or malware score) is calculated based on the monitored/classified suspicious behaviors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
 a processor configured to:
  monitor network traffic to identify suspicious network traffic, wherein the monitored network traffic includes HTTP traffic, IRC traffic, and unclassified application traffic;

monitor behavior indicated in the network traffic to identify malware, wherein the monitored behaviors that indicate potential malware include one or more of the following: connecting to a non-standard HTTP port for HTTP traffic, visiting a non-existent domain, downloading executable files with non-standard executable file extensions, performing a DNS query for an email server, communicating using HTTP header with a shorter than common length, communicating using a post method in HTTP traffic, connecting to a non-standard IRC port for IRC traffic, and communicating unclassified traffic over an HTTP port; and detect a bot based on a heuristic analysis of the suspicious network traffic behavior, wherein the suspicious network traffic behavior includes command and control traffic associated with a bot master; and a memory coupled to the processor and configured to provide the processor with instructions.

2. The system recited in claim 1, wherein the suspicious behavior is a malware download.

3. The system recited in claim 1, wherein the suspicious behavior is a command and control communication determined using a plurality of heuristics.

4. The system recited in claim 1, wherein the monitored network traffic includes malware URLs and unclassified URLs.

5. The system recited in claim 1, wherein the monitored network traffic includes firewall logs.

6. The system recited in claim 1, wherein the memory is further configured to provide the processor with instructions which when executed cause the processor to:
identify generic command and control traffic patterns; and
identify specific command and control traffic patterns.

7. The system recited in claim 1, wherein the memory is further configured to provide the processor with instructions which when executed cause the processor to:
classify the monitored network traffic as command and control traffic associated with a bot master.

8. The system recited in claim 1, wherein the memory is further configured to provide the processor with instructions which when executed cause the processor to:
correlate the suspicious network traffic behavior with a plurality of other suspicious behaviors.

9. The system recited in claim 1, wherein the memory is further configured to provide the processor with instructions which when executed cause the processor to:
correlate the suspicious network traffic behavior with a plurality of other suspicious behaviors associated with a client or a plurality of clients.

10. The system recited in claim 1, wherein the memory is further configured to provide the processor with instructions which when executed cause the processor to:
assign a score to the monitored network traffic, wherein the score corresponds to a botnet risk characterization of the monitored network traffic.

11. The system recited in claim 1, wherein the memory is further configured to provide the processor with instructions which when executed cause the processor to:
assign a score to the monitored network traffic, wherein the score corresponds to a botnet risk characterization of the monitored network traffic; and
increase the score based on a correlation of additional suspicious behaviors associated with the monitored network traffic.

12. The system recited in claim 1, wherein the memory is further configured to provide the processor with instructions which when executed cause the processor to:
assign a score to the monitored network traffic, wherein the score corresponds to a botnet risk characterization of the monitored network traffic;
increase the score based on a correlation of additional suspicious behaviors associated with the monitored network traffic; and
determine the suspicious behavior is associated with a botnet based on the score.

13. The system recited in claim 1, wherein the monitored behaviors that indicate potential malware include one or more of the following: visiting a domain with a domain name that is longer than a common domain name length, visiting a dynamic DNS domain, visiting a fast-flux domain, and visiting a recently created domain.

14. The system recited in claim 1, wherein the monitored visited domain related behavior indicates a potentially malicious domain based on one or more of the following: a domain name length of a visited domain, whether a visited domain is a dynamic DNS domain, whether a visited domain is a fast-flux domain, and whether a visited domain is a recently created domain.

15. A method, comprising:
monitoring network traffic to identify suspicious network traffic, wherein the monitored network traffic includes HTTP traffic, IRC traffic, and unclassified application traffic;
monitoring behavior indicated in the network traffic to identify malware, wherein the monitored behaviors that indicate potential malware include one or more of the following: connecting to a non-standard HTTP port for HTTP traffic, visiting a non-existent domain, downloading executable files with non-standard executable file extensions, performing a DNS query for an email server, communicating using HTTP header with a shorter than common length, communicating using a post method in HTTP traffic, connecting to a non-standard IRC port for IRC traffic, and communicating unclassified traffic over an HTTP port; and
detecting a bot based on a heuristic analysis of the suspicious network traffic behavior using a processor; wherein the suspicious network traffic behavior includes command and control traffic associated with a bot master.

16. The method of claim 15 further comprising:
assigning a score to the monitored network traffic, wherein the score corresponds to a botnet risk characterization of the monitored network traffic;
increasing the score based on a correlation of additional suspicious behaviors associated with the monitored network traffic; and
determining the suspicious behavior is associated with a botnet based on the score.

17. A computer program product, the computer program product being embodied in a non-transitory computer readable storage medium and comprising computer instructions for:
monitoring network traffic to identify suspicious network traffic, wherein the monitored network traffic includes HTTP traffic, IRC traffic, and unclassified application traffic;
monitoring behavior indicated in the network traffic to identify malware, wherein the monitored behaviors that indicate potential malware include one or more of the following: connecting to a non-standard HTTP port for HTTP traffic, visiting a non-existent domain, downloading executable files with non-standard executable file extensions, performing a DNS query for an email server, communicating using HTTP header with a shorter than common length, communicating using a post method in HTTP traffic, connecting to a non-standard IRC port for IRC traffic, and communicating unclassified traffic over an HTTP port; and detecting a bot based on a heuristic analysis of the suspicious network traffic behavior using a processor; wherein the suspicious network traffic behavior includes command and control traffic associated with a bot master.

18. The computer program product recited in claim 17, further comprising computer instructions for:

assigning a score to the monitored network traffic, wherein the score corresponds to a botnet risk characterization of the monitored network traffic;

increasing the score based on a correlation of additional suspicious behaviors associated with the monitored network traffic; and determining the suspicious behavior is associated with a botnet based on the score.

19. The system recited in claim 1, wherein the memory is further configured to provide the processor with instructions which when executed cause the processor to:

assign a score to the monitored network traffic, wherein the score corresponds to a botnet risk characterization of the monitored network traffic;

increase the score based on a correlation of additional suspicious behaviors associated with the monitored network traffic;

determine the suspicious behavior is malicious based on the score falling within a first value range; and determine the suspicious behavior is associated with a botnet based on the score falling within a second value range, the first value range being different from the second value range.

\* \* \* \* \*